(12) United States Patent
Chen et al.

(10) Patent No.: US 9,213,439 B2
(45) Date of Patent: Dec. 15, 2015

(54) OPTICAL IMAGING DEVICE AND IMAGING PROCESSING METHOD FOR OPTICAL IMAGING DEVICE

(75) Inventors: Yu-Yen Chen, New Taipei (TW); Po-Liang Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 281 days.

(21) Appl. No.: 13/570,250

(22) Filed: Aug. 9, 2012

(65) Prior Publication Data

US 2013/0050559 A1 Feb. 28, 2013

(30) Foreign Application Priority Data

Aug. 30, 2011 (TW) .............................. 100131076 A

(51) Int. Cl.
*G06F 3/042* (2006.01)
(52) U.S. Cl.
CPC ....................................... *G06F 3/042* (2013.01)
(58) Field of Classification Search
CPC ........................................................ G06F 3/042
See application file for complete search history.

(56) References Cited

U.S. PATENT DOCUMENTS

| 7,468,785 | B2 | 12/2008 | Lieberman | |
| 2010/0265215 | A1* | 10/2010 | Lai | 345/175 |
| 2011/0221776 | A1* | 9/2011 | Shimotani | G06F 3/0421 345/647 |
| 2011/0266074 | A1* | 11/2011 | Fan et al. | 178/18.09 |
| 2011/0267264 | A1* | 11/2011 | McCarthy | G06F 3/017 345/157 |

FOREIGN PATENT DOCUMENTS

TW 201042520 12/2010

OTHER PUBLICATIONS

Office action mailed on Mar. 25, 2014 for the Taiwan application No. 100131076, filing date: Aug. 30, 2011, p. 1 line 13-14, p. 2-3 and p. 4 line 1-5.

* cited by examiner

*Primary Examiner* — Jason Olson
(74) *Attorney, Agent, or Firm* — Winston Hsu; Scott Margo

(57) ABSTRACT

An optical imaging device includes a display panel whereon a coordinate detecting area is formed, at least one light source disposed outside the display panel for emitting light to illuminate an object, and a depth sensor installed on a side of the display panel for sensing image data of the object. The image data include a width information corresponding to a distance between the object and the depth sensor in a first direction, and a depth information corresponding to a distance between the object and the depth sensor in a second direction. The optical imaging device further includes a control module coupled to the depth sensor for receiving the image data sensed by the depth sensor and for determining whether to calculate a coordinate value of the object according to the width information and the depth information.

17 Claims, 5 Drawing Sheets

OPTICAL IMAGING DEVICE AND IMAGING PROCESSING METHOD FOR OPTICAL IMAGING DEVICE

BACKGROUND OF THE INVENTION

1. Field of the Invention

The Present invention relates to an optical imaging device by using a depth sensor and an imaging processing method, and more particularly, to an optical imaging device and an imaging processing method without using a reflecting frame and being capable of forming a detecting area with an unlimited shape.

2. Description of the Prior Art

In the modern consumer electronic products, a portable electronic product such as a personal digital assistant, a smart phone or a mobile phone is equipped with a touch control device as an interface for data transmission. Since consumer electronic products have become lighter, thinner, shorter and smaller, there is no space on these products for containing a conventional input device, such as a mouse, a keyboard and so on. Furthermore, with development of tablet computers focusing on humanity design, a display with the touch control device has gradually become one of the key components in various electronic products. A variety of touch control technologies, such as a resistive type, a capacitive type, an ultrasonic type, an infrared type, an optical imaging type and so on have been developing. Due to consideration for technology level and cost, the above-mentioned touch control technologies have been implemented in various fields.

For example, principle of the optical imaging design is to utilize two image capturing modules located at two corners of the display for detecting a position of an object on the display. Then, the position of the object on the display is calculated by triangulating location. Thus, compared with the conventional resistive type or capacitive type touch device, it has advantages of accuracy, high penetration, good stability, low damage rate, low cost and being capable of multi-touch, and the optical imaging design is overwhelmingly advantageous in the large-size display market.

In order to locate coordinates of the object in two dimensions, the conventional optical image device needs at least two one dimension image capturing modules (sensors) to detect a shadow formed by the object, and a problem of capturing the images simultaneously by multiple image capturing modules must be considered, resulting increase of cost. Besides, in order to enhance touch sensitivity, it needs to increase refreshing speed of frames of the image capturing modules by a processor with high performance, also resulting in increase of component cost. Moreover, the conventional optical imaging touch device needs a reflecting frame as a photographic background when the object is located within a coordinate detecting area, to isolate interference outside the coordinate detecting area. The object blocks the light reflected from the reflecting frame as locating within the coordinate detecting area so as to detect a shadow by a sensor, for getting the position of the object by the position of the shadow. In other words, the reflecting frame provides the function of blocking the interference and difference between the object and the background. However, the reflecting frame and the sensor have to be installed on the same plane, resulting in difficulty in assembly and increasing manufacturing cost. Under this configuration, the structure of the reflecting frame has to be designed as a square or a rectangular shape instead of other shapes, resulting in limitation of practical application. But it is not easy to determine the object without the reflecting frame due to the interference outside the coordinate detecting area. As a result, design of an optical imaging device for effectively decreasing assembly difficulties and cost and for increasing determining accuracy is an important issue of the touch technology.

SUMMARY OF THE INVENTION

The present invention provides an optical imaging device and an image processing method including a coordinate detecting area with an unlimited shape and without using a reflecting frame to overcome above problems.

According to the disclosure, an optical imaging device includes a display panel whereon a coordinate detecting area is formed, at least one light source disposed outside the display panel for emitting light to illuminate an object, a depth sensor installed on a side of the display panel for sensing image data of the object, the image data comprising a width information corresponding to a distance between the object and the depth sensor in a first direction, and a depth information corresponding to a distance between the object and the depth sensor in a second direction, and a control module coupled to the depth sensor for receiving the image data sensed by the depth sensor and for determining whether the object is located within the coordinate detecting area according to the width information and the depth information.

According to the disclosure, the coordinate detecting area is substantially a fan-shaped area, and the control module is for determining whether the object is located within the coordinate detecting area according to the width information, the depth information and an included angle between an outer edge of the fan-shaped area and the depth sensor.

According to the disclosure, the depth sensor is installed on a center of the side of the display panel.

According to the disclosure, the control module is for determining whether the object is located within the coordinate detecting area according to the width information, the depth information and a width and a depth of the coordinate detecting area.

According to the disclosure, the control module is further for determining whether to calculate a coordinate value of the object within the coordinate detecting area according to a result of determining whether the object is located within the coordinate detecting area.

According to the disclosure, the control module calculates the coordinate value of the object within the coordinate detecting area according to the image data when the control module determines that the object is located within the coordinate detecting area.

According to the disclosure, the control module does not calculate the coordinate value of the object when the control module determines that the object is not located within the coordinate detecting area.

According to the disclosure, the at least one light source is a laser light emitting diode or an infrared light emitting diode.

According to the disclosure, an image processing method for an optical imaging device includes at least one light source of the optical imaging device emitting light to illuminate an object, a depth sensor of the optical imaging device sensing image data of the object, wherein the image data comprise a width information corresponding to a distance between the object and the depth sensor in a first direction, and a depth information corresponding to a distance between the object and the depth sensor in a second direction, and a control module of the optical imaging device determining whether the object is located within the coordinate detecting area according to the width information and the depth information.

The present invention provides the optical imaging device and the image processing method including a coordinate detecting area with an unlimited shape and without using a reflecting frame. The present invention can effectively decrease the amount of detecting components and can operate without using high performance CPU. Therefore it can overcome the assembly difficulty, reduce the manufacturing cost, and have the accurate determination of the touch object with image processing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
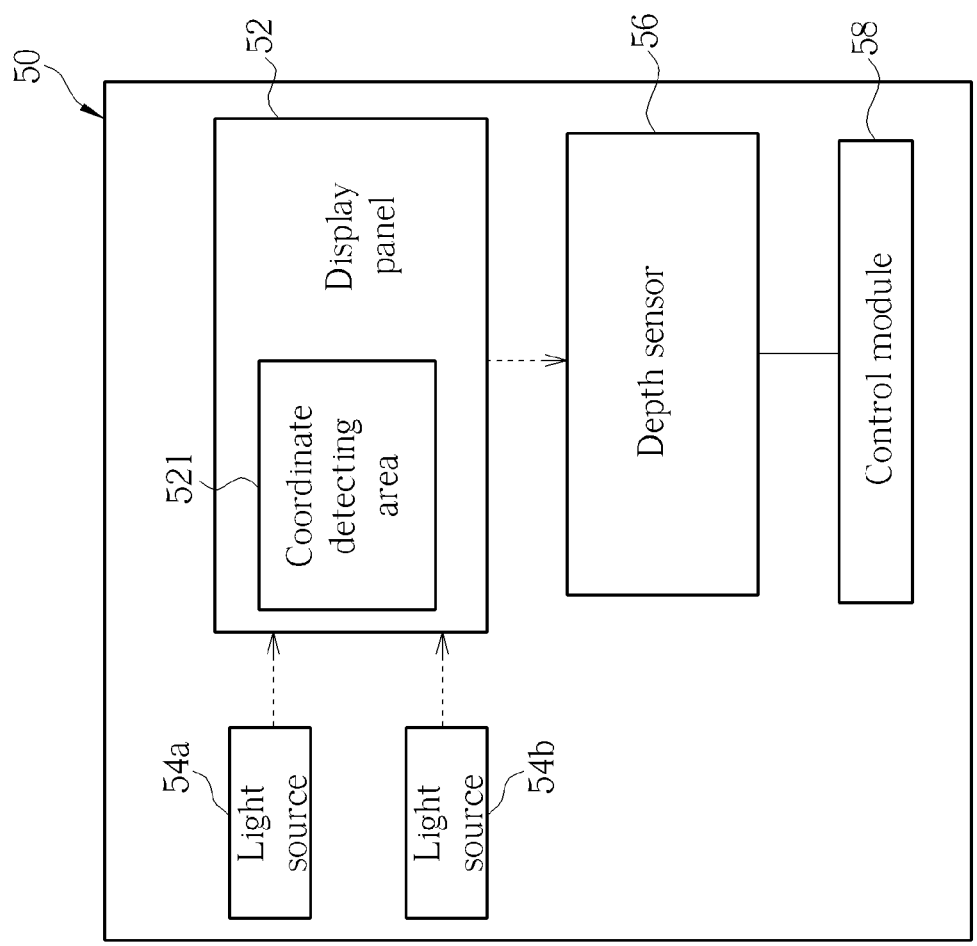
FIG. 1 is a functional block diagram of an optical image device according to an embodiment of the present invention.
Figure 2:
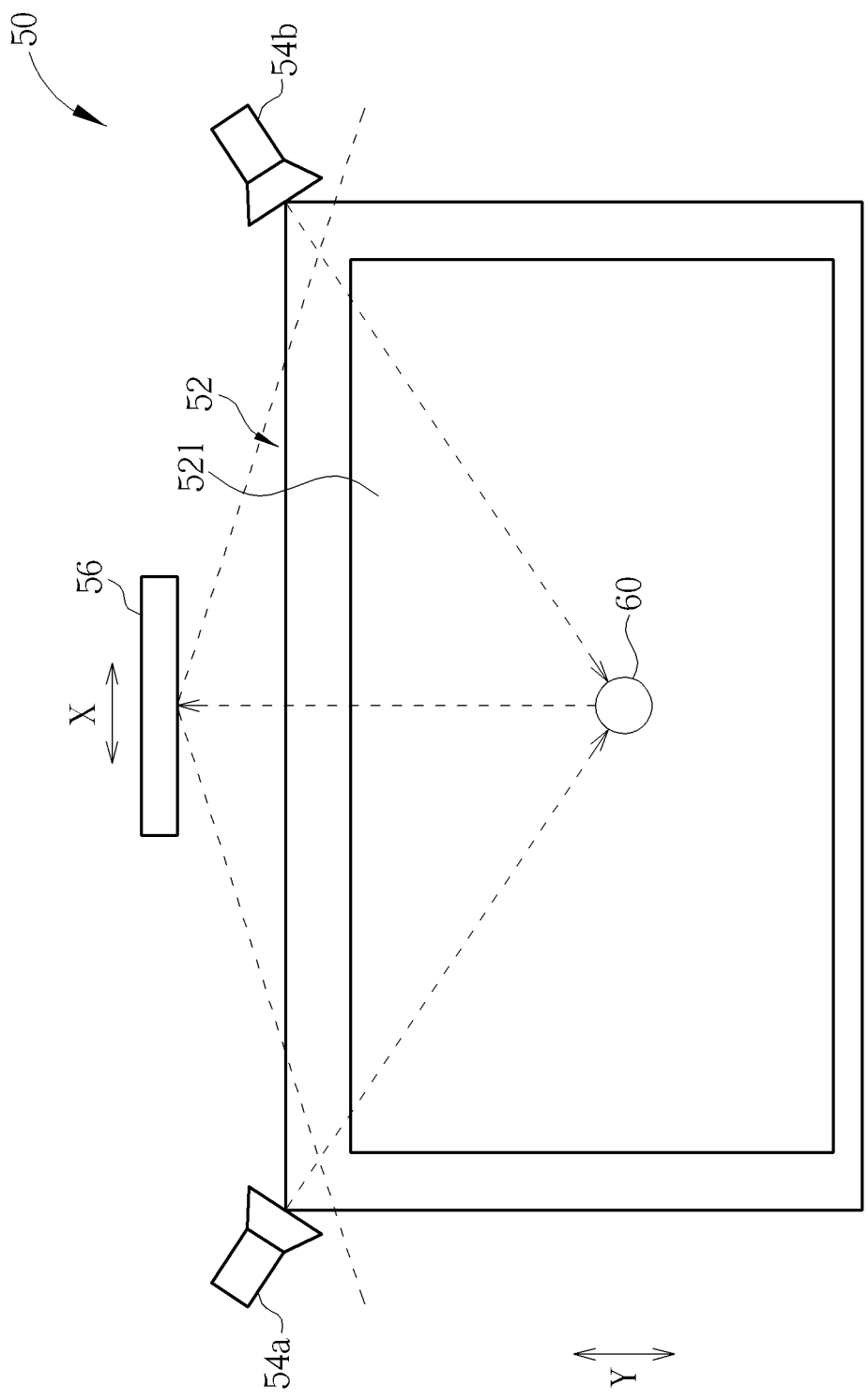
FIG. 2 and FIG. 3 are respectively a front view and a side view of the optical image device according to the embodiment of the present invention.
Figure 3:
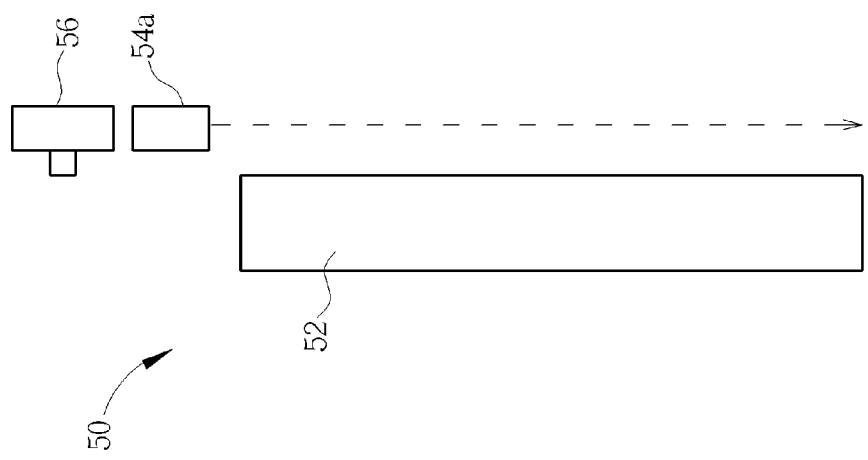

Please refer to FIG. 1 to FIG. 3. FIG. 1 is a functional block diagram of an optical image device 50 according to an embodiment of the present invention. FIG. 2 and FIG. 3 are respectively a front view and a side view of the optical image device 50 according to the embodiment of the present invention. The optical image device 50 includes a display panel 52, two light sources 54a and 54b, a depth sensor 56 and a control module 58. The display panel 52 can be a touch panel whereon a coordinate detecting area 521 is formed. The two light sources 54a and 54b are respectively disposed at two corners outside the display panel 52, and the two light sources 54a and 54b are used for emitting light to illuminate an object 60. The two light sources 54a and 54b can be a laser light emitting diode or an infrared light emitting diode respectively. Positions and an amount of the light sources are not limited to this embodiment described above, and it depends on actual demand. The depth sensor 56 is installed on a side of the display panel 52, such as a center of the side of the display panel 52. The depth sensor 56 is used for sensing image data of the object 60 (such as a user's finger). The image data can include a width information corresponding to a distance between the object 60 and the depth sensor 56 in a first direction (X direction), and a depth information corresponding to a distance between the object 60 and the depth sensor 56 in a second direction (Y direction). That is, the depth sensor 56 can sense information of the distances between the object 60 and the depth sensor 56 in the first direction (X direction) and the second direction (Y direction).

The control module 58 is coupled to the depth sensor 56. The control module 58 is for receiving the image data sensed by the depth sensor 56 and for determining whether the object 60 is located within the coordinate detecting area 521 according to the width information and the depth information. And the control module 58 is further for determining whether to calculate a coordinate value of the object 60 within the coordinate detecting area 521 according to a result of determining whether the object 60 is located within the coordinate detecting area 521. The control module 58 can be implemented by hardware, software, firmware, and so on. Besides, the display panel 52, the two light sources 54a and 54b, the depth sensor 56 and the control module 58 of the present invention can be integrated within the same display, such as being integrated within a monitor or an All In One PC and so on. The two light sources 54a and 54b, the depth sensor 56 and the control module 58 can be modularized separately, such as hanging on a frame of the display panel 52, and the coordinate detecting area 521 can correspond to a transparent panel on the frame, so that it can be disassembled and installed on the different display panel 52.

Figure 4:
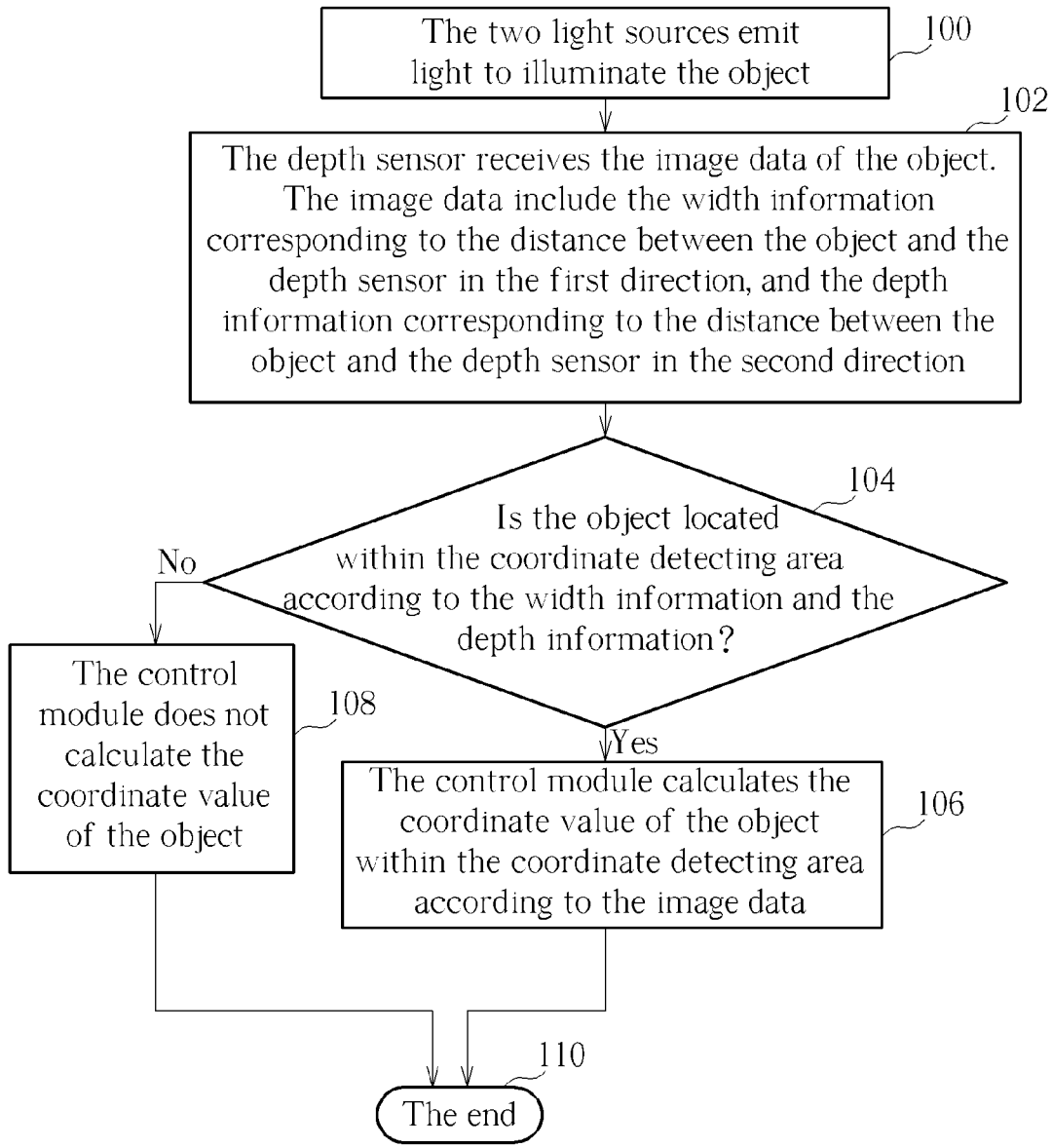
FIG. 4 is a flow chart of an image processing method executed by the optical image device according to the embodiment of the present invention.

In order to implement the optical imaging device 50, users can perform touch operation within the coordinate detecting area 521, such as moving fingers (the object 60) within the coordinate detecting area 521. When the object 60 is moving within the coordinate detecting area 521, the light emitted from the two light sources 54a and 54b can be reflected by the object 60 so that the depth sensor 56 can sense the light reflected by the object 60. Please refer to FIG. 4. FIG. 4 is a flowchart of an image processing method executed by the optical imaging device 50 according to the embodiment of the present invention. The method includes following steps:

Step 100: The two light sources 54a, 54b emit light to illuminate the object.

Step 102: The depth sensor 56 receives the light reflected from the object 60 so as to sense the image data of the object 60. The image data include the width information corresponding to the distance between the object 60 and the depth sensor 56 in the first direction (X direction), and the depth information corresponding to the distance between the object 60 and the depth sensor 56 in the second direction (Y direction).

Step 104: The control module 58 determines whether the object 60 is located within the coordinate detecting area 521 according to the width information and the depth information. If yes, perform step 106; if no, go to step 108.

Step 106: When the control module 58 determines that the object 60 is located within the coordinate detecting area 521, the control module 58 calculates the coordinate value of the object 60 located within the coordinate detecting area 521 according to the image data.

Step 108: When the control module 58 determines that the object 60 is not located within the coordinate detecting area 521, the control module 58 does not calculate the coordinate value of the object 60.

Step 110: The end.

Detailed introduction is described as follows. First, the two light sources 54a and 54b can respectively emit the light to illuminate the object 60, such as emitting a linear planar beam to the coordinate detecting area 521. And then the depth sensor 56 can receive the light reflected from the object 60 so as to sense the image data of the object 60. The depth sensor 56 can not only provide two-dimension position information but also provide depth information of a sensed object. It means that the depth sensor 56 can not only provide the width information corresponding to the distance between the object 60 and the depth sensor 56 in the first direction (X direction), but also provide the depth information corresponding to the distance between the object 60 and the depth sensor 56 in the second direction (Y direction). Next, the control module 58 can receive the image data sensed by the depth sensor 56 and determine whether the object 60 is located within the coordinate detecting area 521 according to the width information and the depth information.

Take the coordinate detecting area 521 with a square or rectangular shape as an example, an effective range of the coordinate detecting area 521 is defined in the control module 58 first. It means that a width range in the first direction (X direction) and a depth range in the second direction (Y direction) are defined. Therefore the control module 58 can determine whether the object 60 is located within the coordinate detecting area 521 according to a comparison result between the width information and the depth information of the object 60 provided by the depth sensor 56 and the effective width range and the effective depth range of the coordinate detecting area 521. That is, when both of the width information and the depth information of the object 60 are respectively located within the effective width range and the effective depth range of the coordinate detecting area 521, the object 60 is located within the coordinate detecting area 521. On the contrary, when either of the width information and the depth information of the object 60 is not respectively located within the effective width range and the effective depth range of the coordinate detecting area 521, the object 60 is not located within the coordinate detecting area 521.

Furthermore, the control module 58 can determine whether to calculate the coordinate value of the object 60 located within the coordinate detecting area 521 according to the result of determining whether the object 60 is located within the coordinate detecting area 521. It means that when the control module 58 determines that the object 60 is located within the coordinate detecting area 521, the control module 58 can calculate the coordinate value of the object 60 located within the coordinate detecting area 521 according to the image data. For example, the control module 58 can perform image processing analysis such as noise reduction to the image data of the object 60. Then a coordinate transformation calculation is performed to the image data processed with image processing. For example, the width information and the depth information are projected onto a position located within the coordinate detecting area 521 and finally transformed to a corresponding coordinate value. Because the calculated coordinate value of the object 60 is located within the coordinate detecting area 521, the control module 58 will determine that the object 60 is an effective touch object and provide the host computer with a basis to perform the related touch operation. On the contrary, when the control module 58 determines that the object 60 is not located within the coordinate detecting area 521, the control module 58 will not calculate the coordinate value of the object 60. It means that the control module 58 determine that the object 60 is not an effective touch object and the control module 58 does not perform relative touch operation so as to filter out unnecessary calculation of objects for effectively conserve system resources.

Figure 5:
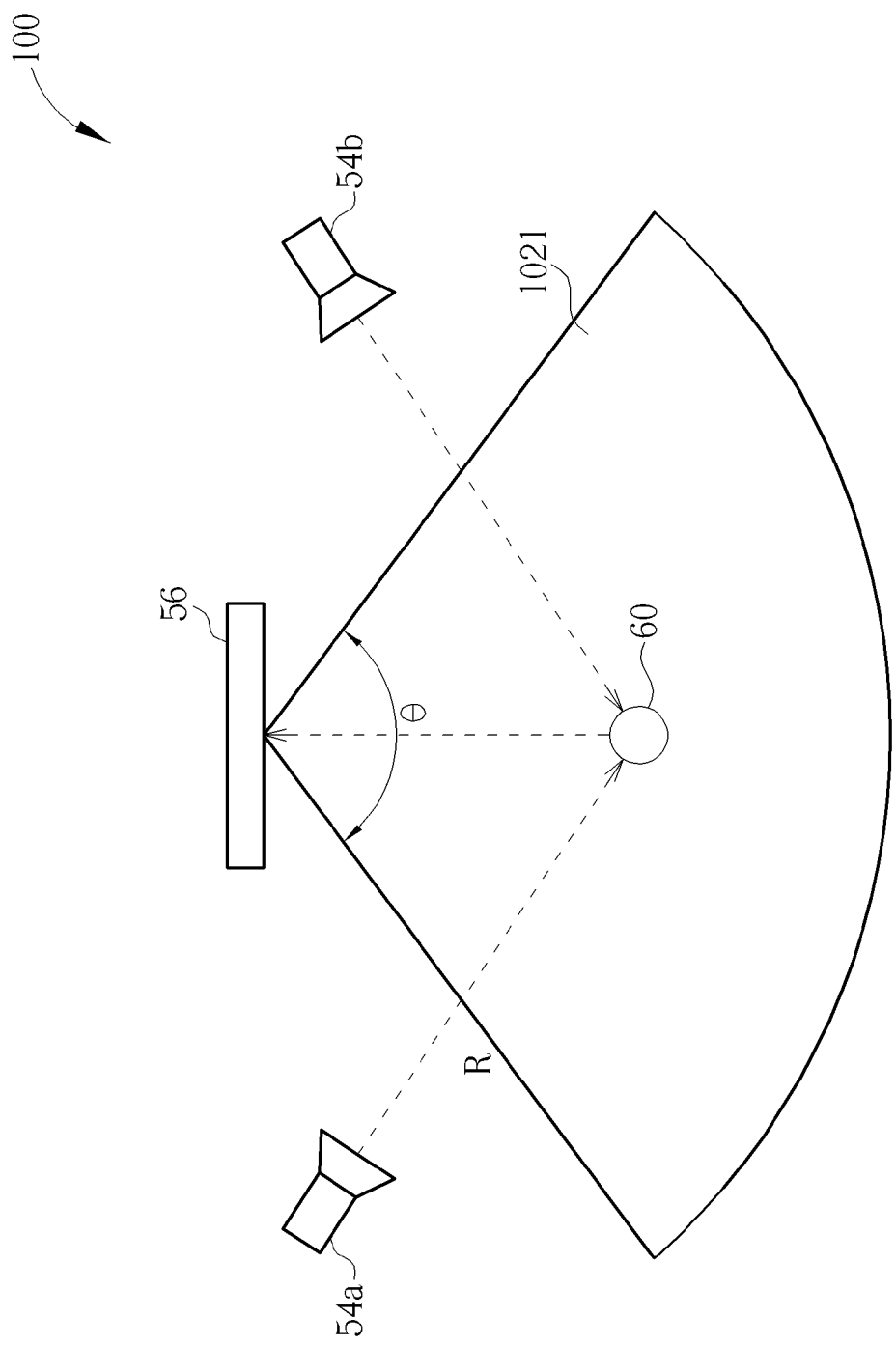
FIG. 5 is a front view of an optical imaging device according to another embodiment of the present invention.

Please refer to FIG. 5. FIG. 5 is a front view of an optical imaging device 100 according to another embodiment of the present invention. The difference between this embodiment and the previous one is that the coordinate detecting area can be defined as other shape in this embodiment. The shape of the coordinate detecting area is not limited to a square or rectangular shape, as long as an effective range of the coordinate detecting area can be defined first. As shown in FIG. 5, a coordinate detecting area 1021 of the optical imaging device 100 can be defined substantially as a fan-shaped area or other shape such as a triangle, circular or star shape. The shape of the coordinate detecting area 1021 depends on actual demand of design and the principle thereof is the same as the previous embodiment. For example, when the coordinate detecting area 1021 is substantially defined as a fan-shaped area, the effective range of the coordinate detecting area 1021 can be defined in the control module 58 first. An effective range of an included angle θ and an effective range of a radius R of the coordinate detecting area 1021 can be defined by a polar coordinate system. Therefore the control module 58 can determine whether the object 60 is located within the coordinate detecting area 1021 according to the width information, the depth information, the included angle θ between an outer edge of the fan-shaped area and the depth sensor 56 and the radius R. For comparing the width information and the depth information with the effective range of the coordinate detecting area 1021, transformation relation of the polar coordinate system and the Cartesian coordinate system can be used to coincide with position information of the object 60 and the coordinate detecting area 1021. That is, the Effective range of the included angle θ and the effective range of the radius R of the coordinate detecting area 1021 can be transformed into an effective range of the width and an effective range of the depth in a Cartesian coordinate system, and then be compared with the width information and the depth information of the object 60 provided by the depth sensor 56. Or the width information and the depth information of the object 60 provided by the depth sensor 56 can be transformed into the included angle θ and the radius R in the polar coordinate system, and then be compared with the effective range of the included angle θ and the effective range of the radius R of the coordinate detecting area 1021. The transformation relation of the polar coordinate system and the Cartesian coordinate system shows below:

$X=R*\cos(\theta), Y=R*\sin(\theta);$ $R=\sqrt{(X2+Y2)}, \theta=\tan-1(Y/X), X \neq 0$ After transformation and comparison, the control module 58 can determine whether to calculate the coordinate value of the object 60 located within the coordinate detecting area 1021 according to whether a result of determining whether the object 60 is located within the coordinate detecting area 1021. Other principle of operation is the same as the previous embodiment, so it is not described in detail. The coordinate detecting area of this embodiment is not limited to a square, rectangular or other shape, and it can enhance practical application. Moreover, if the conventional triangulating location is adopted to locate the touch position of the coordinate detecting area defined with other shape (such as fan-shaped), it will waste a lot of space such as a space between a rectangular frame and the fan-shaped coordinate detecting area, which increases manufacture cost and occupies mechanism space. A display panel of the present invention can be designed corresponding to a shape defined by the coordinate detecting area so as to save manufacture cost and to decrease the occupied mechanism space.

In contrast to the prior art, the present invention provides the optical imaging device and the image processing method including a coordinate detecting area with an unlimited shape and without Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device for detecting a position of an object, comprising:
   a display defined a coordinate detecting area;
   a depth sensor installed in the display for generating image data of the object, the image data comprising a width information corresponding to a distance between the object and the depth sensor in a first direction, and a depth information corresponding to a distance between the object and the depth sensor in a second direction; and a control module coupled to the depth sensor for receiving the image data and determining whether the object is located within the coordinate detecting area according to a comparison result of the width information and the depth information provided by the depth sensor and a predetermined effective range of the coordinate detecting area, wherein the control module further determines whether to calculate a coordinate value of the object within the coordinate detecting area according to a result of determining whether the object is located within the coordinate detecting area.

2. The optical touch device of claim 1, wherein the coordinate detecting area is substantially a fan-shaped area, and the control module is for determining whether the object is located within the coordinate detecting area according to a comparison result of the width information, the depth information and a predetermined effective range of an included angle between an outer edge of the fan-shaped area and the depth sensor.

3. The optical touch device of claim 1, wherein the depth sensor is installed on a center of a side of the display.

4. The optical touch device of claim 2, wherein the depth sensor is installed on a center of a side of the display.

5. The optical touch device of claim 1, wherein the control module is for determining whether the object is located within the coordinate detecting area according to a comparison result of the width information, the depth information and a predetermined effective range of a width and a depth of the coordinate detecting area.

6. The optical touch device of claim 1, wherein the control module calculates the coordinate value of the object within the coordinate detecting area according to the image data when the control module determines that the object is located within the coordinate detecting area.

7. The optical touch device of claim 1, wherein the control module does not calculate the coordinate value of the object when the control module determines that the object is not located within the coordinate detecting area.

8. The optical touch device of claim 1, further comprising a light source disposed on an edge of the display for emitting light, and the light source being a laser light emitting diode or an infrared light emitting diode.

9. The optical touch device of claim 1, further comprising a light source disposed on an edge of the display for emitting light.

10. An image processing method for an optical imaging device to detect a position of an object, comprising:
a depth sensor of the optical imaging device generating image data of the object, wherein the image data comprise a width information corresponding to a distance between the object and the depth sensor in a first direction, and a depth information corresponding to a distance between the object and the depth sensor in a second direction;
a control module of the optical imaging device determining whether the object is located within the coordinate detecting area according to a comparison result of the width information and the depth information provided by the depth sensor and a predetermined effective range of the coordinate detecting area; and
the control module determining whether to calculate a coordinate value of the object within the coordinate detecting area according to a result of determining whether the object is located within the coordinate detecting area.

11. The image processing method of claim 10, wherein the coordinate detecting area is substantially a fan-shaped area, and the control module of the optical imaging device determining whether the object is located within the coordinate detecting area according to a comparison result of the width information and the depth information provided by the depth sensor and a predetermined effective range of the coordinate detecting area comprises the control module determining whether the object is located within the coordinate detecting area according to a comparison result of the width information, the depth information and a predetermined effective range of an included angle between an outer edge of the fan-shaped area and the depth sensor.

12. The image processing method of claim 11, further comprising installing the depth sensor on a center of a side of a display.

13. The image processing method of claim 10, further comprising installing the depth sensor on a center of a side of a display.

14. The image processing method of claim 10, wherein the control module of the optical imaging device determining whether the object is located within the coordinate detecting area according to a comparison result of the width information and the depth information provided by the depth sensor and a predetermined effective range of the coordinate detecting area comprises the control module determining whether the object is located within the coordinate detecting area according to a comparison result of the width information, the depth information and a predetermined effective range of a width and a depth of the coordinate detecting area.

15. The image processing method of claim 10, further comprising the control module calculating the coordinate value of the object within the coordinate detecting area according to the image data when the control module determines that the object is located within the coordinate detecting area.

16. The image processing method of claim 10, further comprising the control module not calculating the coordinate value of the object when the control module determines that the object is not located within the coordinate detecting area.

17. The image processing method of claim 10, further comprising:
a light source of the optical imaging device emitting light to illuminate the object.

* * * * *